United States Patent [19]
Glenn

[11] Patent Number: 4,517,597
[45] Date of Patent: May 14, 1985

[54] METHOD AND APPARATUS FOR ENCODING AND DECODING VIDEO

[75] Inventor: William E. Glenn, Ft. Lauderdale, Fla.

[73] Assignee: New York Institute of Technology, Westbury, N.Y.

[21] Appl. No.: 418,055

[22] Filed: Sep. 14, 1982

[51] Int. Cl.³ ............................................. H04N 5/14
[52] U.S. Cl. .................... 358/141; 358/13; 358/138; 358/12
[58] Field of Search .................. 358/12, 13, 133, 135, 358/138, 141

[56] References Cited

U.S. PATENT DOCUMENTS

| | | | |
|---|---|---|---|
| 2,921,124 | 1/1960 | Graham | 358/138 |
| 2,939,909 | 6/1960 | Toulon | 178/6.8 |
| 3,035,121 | 5/1962 | Schreiber | 179/15.55 |
| 3,037,083 | 5/1962 | Inouye | 179/15.55 |
| 3,715,483 | 2/1973 | Limb | 178/6.8 |
| 4,068,258 | 1/1978 | Bied-Charreton | 358/4 |
| 4,148,070 | 4/1979 | Taylor | 358/141 |
| 4,292,652 | 9/1981 | Yumde | 358/138 |
| 4,365,273 | 12/1982 | Yamada | 358/133 |
| 4,375,650 | 3/1983 | Tiemann | 358/138 |
| 4,402,010 | 8/1983 | Vogelman | 358/133 |
| 4,429,327 | 1/1984 | Oakley | 358/12 |

OTHER PUBLICATIONS

Implications of Sustained and Transient Channels for Theories of Visual Pattern Masking, Saccadic Suppression, and Information Processing, Breitmeyer et al., Psychological Review, vol. 83, No. 1, (Jan. 1976).

High Resolution NTSC Television System, Dill, IBM Tech. Disc. Bulletin, vol. 21, No. 5, Oct. 1978, pp. 2148-2153.

High Definition Television Studies on Compatible Basis with Present Standard, Wendland, Future Directions for Television, pp. 151-165, Date Unknown.

Primary Examiner—Michael A. Masinick
Attorney, Agent, or Firm—Martin Novack

[57] ABSTRACT

The disclosure is directed to an apparatus and method for encoding and/or decoding video signals for use in a compatible high definition television system or in other applications. In a form of the disclosure there is provided an encoder which stores an input frame as an array of digital pixel values. The stored array is interrogated to generate a sum signal and at least one difference signal. The sum signal is representative of the sum of the pixel values in a group of pixels. The difference signal is representative of the difference between the total of the pixel values in some of the pixels in the group and the total of the pixel values of other pixels in the group. The sum signal and the difference signal are generated for a multiplicity of groups which cover the video frame. The sum signal is generated at a relatively high information rate and the difference signal is generated at a relatively low information rate. In the decoder the sum and difference signals are combined to obtain an output pixel value for each pixel of an output video frame.

91 Claims, 14 Drawing Figures

METHOD AND APPARATUS FOR ENCODING AND DECODING VIDEO

BACKGROUND OF THE INVENTION

This invention relates to video signals and, more particularly, to apparatus and method for encoding and decoding video signals for use in a compatible high definition television system as well as in other applications. The subject matter hereof is related to subject matter in copending U.S. application Ser. No. 418,053, filed of even date herewith and assigned to the same assignee as the present application.

It is well recognized that it would be desirable to have television exhibit higher definition for the viewer. The Society of Motion Picture and Television Engineers ("SMPTE") convened a study group to study various aspects of high definition television systems, including such systems for use in the home. The SMPTE study group concluded, among other things, that any new service which provides higher definition television than is conventionally broadcast (i.e., more elements per line and lines per frame, and thus a wider bandwidth necessary for transmission) should serve existing home television receivers with essentially all the picture attributes and quality of which the receivers are capable (see SMPTE Journal, Volume 89, No. 3, pp. 153–161, March, 1980.) As an example, the study group cited the instance when the NTSC compatible color service was first introduced. Monochrome receivers then in the hands of the public reproduced from the color broadcasts a monochrome version of the broadcast, essentially without compromise either in electronic performance of the receivers or in the quality of the reproduction. The SMPTE study group also noted that receivers designed for new (high definition) service, should be capable of operating using the pre-existing transmissions and derive from them a result not inferior to that providing by pre-existing receivers.

The reports of the SMPTE study group indicated the difficulty of identifying the means by which an acceptable compatible system can be achieved. To applicant's knowledge, no such system has been developed. It is an object of the present invention to set forth a high definition television system which is believed to meet practical requirements of performance and compatibility and have operating parameters sufficiently flexible to fit within standards that are ultimately adopted by television industry.

It is a further object of the present invention to provide an encoding and decoding technique that is useful for transmitting or storing video information in a form that requires reduced bandwidth channels or reduced storage size, as the case may be.

SUMMARY OF THE INVENTION

The present invention is directed to an apparatus and method for encoding and/or decoding video signals for use in a compatible high definition television system or in other applications. The invention makes use, inter alia, of certain characteristics of human vision. In particular, psychophysical measurements have indicated that two different types of neurons are used in vision. One type of neuron, which detects low resolution imagery is relatively sensitive to temporal transients and has a time constant for build-up and decay of information that is believed to be about 40 to 80 milliseconds. A second type of neuron is apparently used for transmitting relatively high resolution information from the fovea. This type neuron is believed to have a time constant of 200 to 350 milliseconds. Also, it is believed that stimulation of the first type of neuron by a transient will inhibit reception of information from the second type of neuron. These characteristics of human visual perception allow development of an image transmission system in which the transmission bandwidth can be substantially reduced without degradation of the image as perceived by the viewer. Since rapidly changing information is, as explained, perceived at lower resolution, it is only necessary to transmit this information with the bandwidth necessary to transmit a relatively low (e.g. conventional television) resolution image at, say, 30 frames per second. Since relatively higher resolution information can only be perceived in approximately one-third of a second, the bandwidth required to transmit the relatively higher resolution information can be effectively reduced, since an appropriately lower effective frame rate is all that is necessary for its transmission. Since the relatively higher resolution imagery is inhibited after a transient, the eye is not expected to be able to detect the fact that it takes a longer time (e.g. one-third of a second) to present the higher resolution image.

It is generally known that video transmission systems can be provided with a frame store at the transmitting and receiving ends, and certain portions of the video information can be transmitted and stored at the receiver less frequently and then repeated during generation of the video signal at the receiver. The present invention, in addition to improving over such system by making maximum use of observed human visual perception characteristics, also has the advantage of providing high and low definition versions of the video, if desired, and the further advantage of having the lower definition video be compatible with existing television standards.

In accordance with a form of the invention, there is provided an encoder which includes means for storing an input frame as an array of pixel values (which are preferably, although not necessarily, digital pixel values), and means for interrogating the stored array and for generating a sum signal and at least one difference signal. The sum signal is representative of the sum of the pixel values in a group of pixels. The difference signal is representative of the difference between the total of the pixel values in some of the pixels in the group and the total of the pixel values of other pixels in the group. The sum signal and the difference signal are generated for a multiplicity of groups which cover the video frame. The sum signal is generated at a relatively high information rate (e.g. once each conventional television frame) and the difference signal is generated at a relatively low information rate (e.g. once every three or more television frames). In an illustrated embodiment of the invention, the sum signal is generated for each frame of a series of frames, and a distinct difference signal is generated for each frame of the series.

The encoded sum signal and the encoded difference signals may be converted into analog signals and modulated onto separate carriers for transmission. At a receiver, the sum and difference signals can be recovered from the carriers and digitized before the decoding thereof. In accordance with a feature of the invention, the decoder includes means for storing the sum signal and each of the difference signals, and means for combining the sum and difference signals to obtain an output pixel value for each pixel of an output video frame. The number of pixels in the output video frames of the decoder is substantially the same as the number of pixels in the original high definition digitized video frame arrays, and the pixel values of pixels of the output video frames correspond to pixel values of the corresponding pixels of the input video frame array. In the preferred embodiment, the means in the decoder for storing the sum and difference signals comprise digital memories which are clocked in at a relatively slow clock rate and clocked out, to the combining means, at a relatively fast clock rate. The pixels output from the combining means can be converted into an output analog video signal for display.

In a disclosed embodiment, each group of pixels of the stored array, as a group, covers approximately the same area as an individual pixel of conventional television resolution element. Accordingly, the sum signal, which is generated during each conventional television frame, can be adapted for use by a conventional television receiver and would be viewed with the same resolution as existing television. For receivers which are equipped with means for recovering the difference signals and performing the decoding, improved picture resolution (such as improvement by a factor of two in each dimension for a particular exemplary embodiment hereof) can be achieved. It will be understood, however, that different pixel group configurations can be employed to achieve different levels of visual definition improvement as compared to the lower resolution sum signal when taken alone. It will also be understood that the invention has application in systems wherein it is desireable to have video signals transmitted or stored with the same perceived resolution as in an existing system, but requiring less bandwidth due to the lower overall information rate with which it is necessary to send the higher definition information.

In a motion picture of film application of the present invention, the intermixing of encoded higher and lower resolution frames can be utilized to record video information on a relatively smaller film area than was previously required for recording of information having the same effective resolution. Also, in such applications, it may again be desireable to have the information available in both relatively low and relatively high resolution formats, as provided by the invention.

Further features and advantages of the invention will become more readily apparent from the following detailed description when taken in conjunction with the accompanying drawings.

DESCRIPTION OF THE PREFERRED EMBODIMENTS

Figure 1:
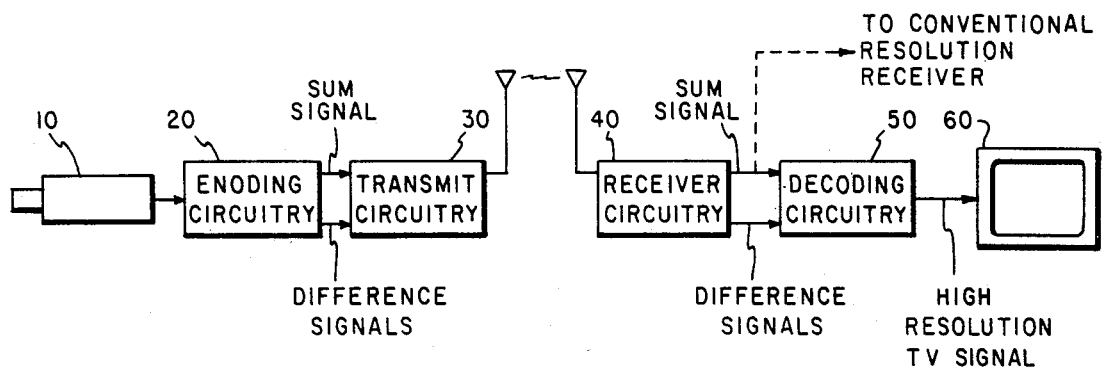
FIG. 1 is a block diagram of compatible high definition television system in accordance with an embodiment of the invention and which can be used to practice the method of the invention.

Referring to FIG. 1, there is shown a block diagram of a high definition television system in accordance with an embodiment of the invention. A high resolution television camera 10, which is assumed for ease of explanation to be a monochrome camera, generates television video signals which are coupled to encoding circuitry 20. The encoding circuitry operates, in accordance with principles to be described, to digitize the video frames into arrays of pixels and produce a sum or "intensity" signal I, and three difference signals designated as the X, Y and Z difference signals. The I signal contains information in a frequency bandwidth that is substantially equivalent to conventional television luminance bandwidth. The encoding circuitry also produces a plurality of auxiliary signals, called "difference signals", which, when taken in conjunction with the sum signal, can later be used to obtain substantially the high resolution information contained in the original digitized frames of video. The sum signal and the difference signals are converted to analog form and coupled to transmitting circuitry 30 which may include means for modulating carriers with the sum and difference signals and transmitting the modulated characters.

At the receiver end, receiving circuitry 40 recovers the sum and difference signals, which are in turn, coupled to decoding circuitry 50. The decoding circuitry 50, digitizes the sum and difference signals and combines them to obtain a pixel value for each pixel of an output video frame that is equivalent to the pixel value of the corresponding pixel of the original high resolution frame digitized at the encoder. The high resolution digital video signal is converted to analog form and displayed on the display 60. A feature of the invention is that the sum signal I is compatible with conventional broadcast television and can be employed by home receivers which are not equipped with the decoder circuitry necessary to obtain the higher resolution video.

Figure 2:
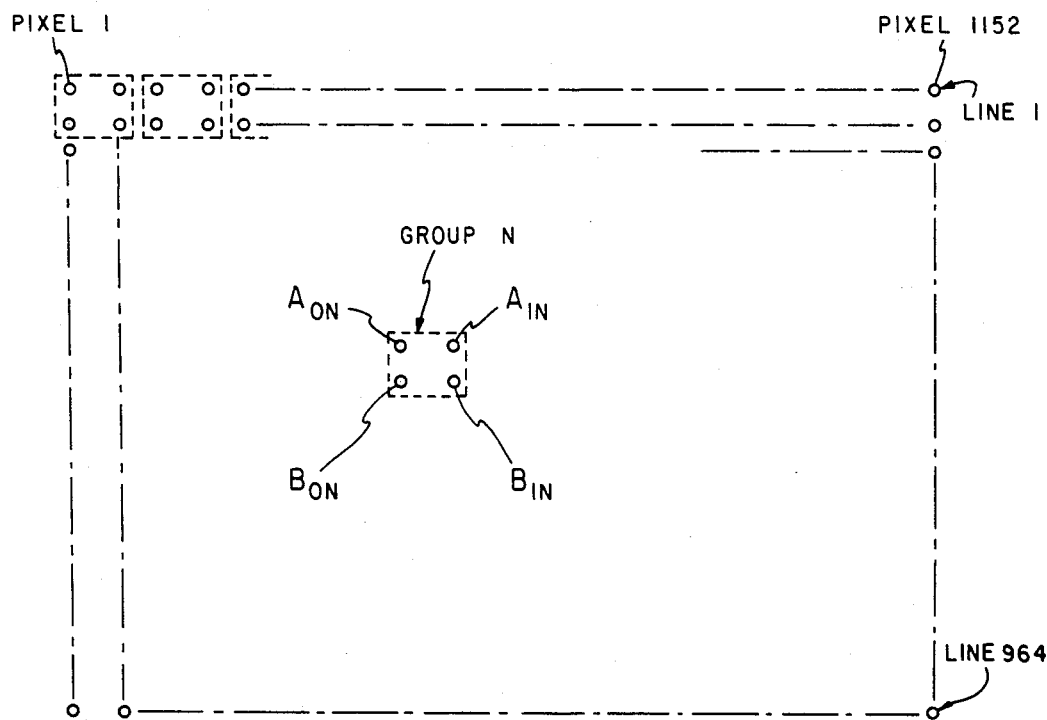
FIG. 2 illustrates scanlines and pixel groups of a high resolution digitized frame of a described embodiment.

FIG. 2 is useful in understanding the manner in which the sum (or intensity) and difference signals are generated for an array of pixels. In the FIGURE, the pixels are represented by the small dots, there being 1152 in a line, and 964 viewable lines per frame in the present example. The pixels of FIG. 2 can be thought of as "high resolution" pixels, in that there are approximately twice as many horizontal and vertical elements or pixels per frame as compared to conventional broadcast television. The pixels of the present embodiment are divided into groups of four pixels each, as shown. Therefore, the groups can be designated horizontally as group 1 through group 576, and the lines of groups can be designated as group line 1 through group line 482. Accordingly, the number of pixel groups approximately corresponds to the number of resolution elements in conventional broadcast television. In the present embodiment, a sum or intensity signal I is formed of the four pixels in each group, this sum signal (when properly scaled) being representative of the average intensity (or luminance) level in the elemental area defined by the pixel group. If the pixels in a given group n, falling on an adjacent line pair designated as line A and line B, are designated as $A_{0n}$, $A_{1n}$, $B_{0n}$, and $B_{1n}$, as illustrated in FIG. 2, then the sum or intensity signal, $I_n$, is expressed as:

$$I_n = A_{0n} + A_{1n} + B_{0n} + B_{1n} \quad (1)$$

The difference signals of the present embodiment, expressed as $X_n$, $Y_n$ and $Z_n$, and taken by subtracting the sum of the columns, the sum of the rows, and the sum of the diagonals, respectively, are as follows:

$$X_n = (A_{0n} + B_{0n}) - (A_{1n} + B_{1n}) = A_{0n} - A_{1n} + B_{0n} - B_{1n} \quad (2)$$

$$Y_n = (A_{0n} + A_{1n}) - (B_{0n} + B_{1n}) = A_{0n} + A_{1n} - B_{0n} - B_{1n} \quad (3)$$

$$Z_n = (A_{0n} + B_{1n}) - (A_{1n} + B_{0n}) = A_{0n} - A_{1n} - B_{0n} + B_{1n} \quad (4)$$

The signs could, of course, be reversed for all difference signals. When the independent equations (1) through (4) are solved for $A_{0n}$, $B_{0n}$, $A_{1n}$ and $B_{1n}$, the following solutions are obtained:

$$A_{0n} = \frac{I_n + X_n + Y_n + Z_n}{4} \quad (5)$$

$$A_{1n} = \frac{I_n - X_n + Y_n - Z_n}{4} \quad (6)$$

$$B_{0n} = \frac{I_n + X_n - Y_n - Z_n}{4} \quad (7)$$

$$B_{1n} = \frac{I_n - X_n - Y_n + Z_n}{4} \quad (8)$$

Relationships (5) through (8) are used in the decoding circuitry at the receiver end to recover the pixel values originally stored at the encoder.

In the present embodiment of the invention, the "low resolution" intensity signal I (which will be understood hereinafter to be at substantially conventional broadcast television resolution) is generated at the conventional television video frame rate, and a full complement of difference signals is generated at one-third the conventional television video frame rate. It will be understood, however, that other rates can be employed. In the present embodiment the difference signals X, Y and Z are formed in sequence, one frame of a single difference signal being formed during the period of a conventional television video frame.

Figure 3:
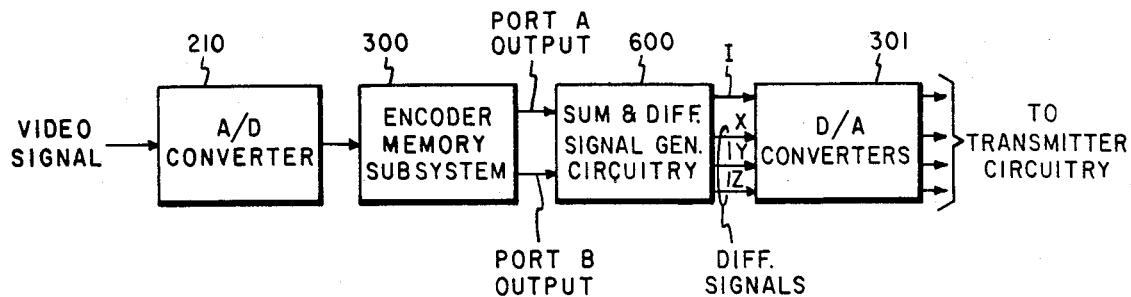
FIG. 3 is a block diagram of the encoding circuitry of FIG. 1.
Figure 4:
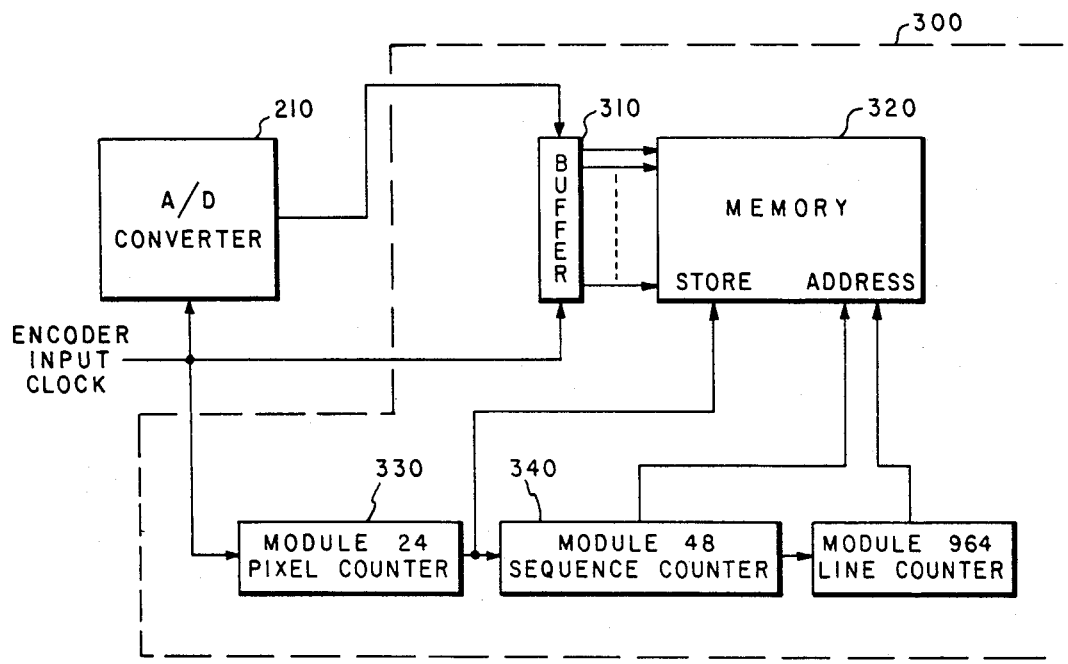
FIG. 4 is a block diagram of a portion of the encoder memory subsystem, showing the input control and addressing thereof.
Figure 5:
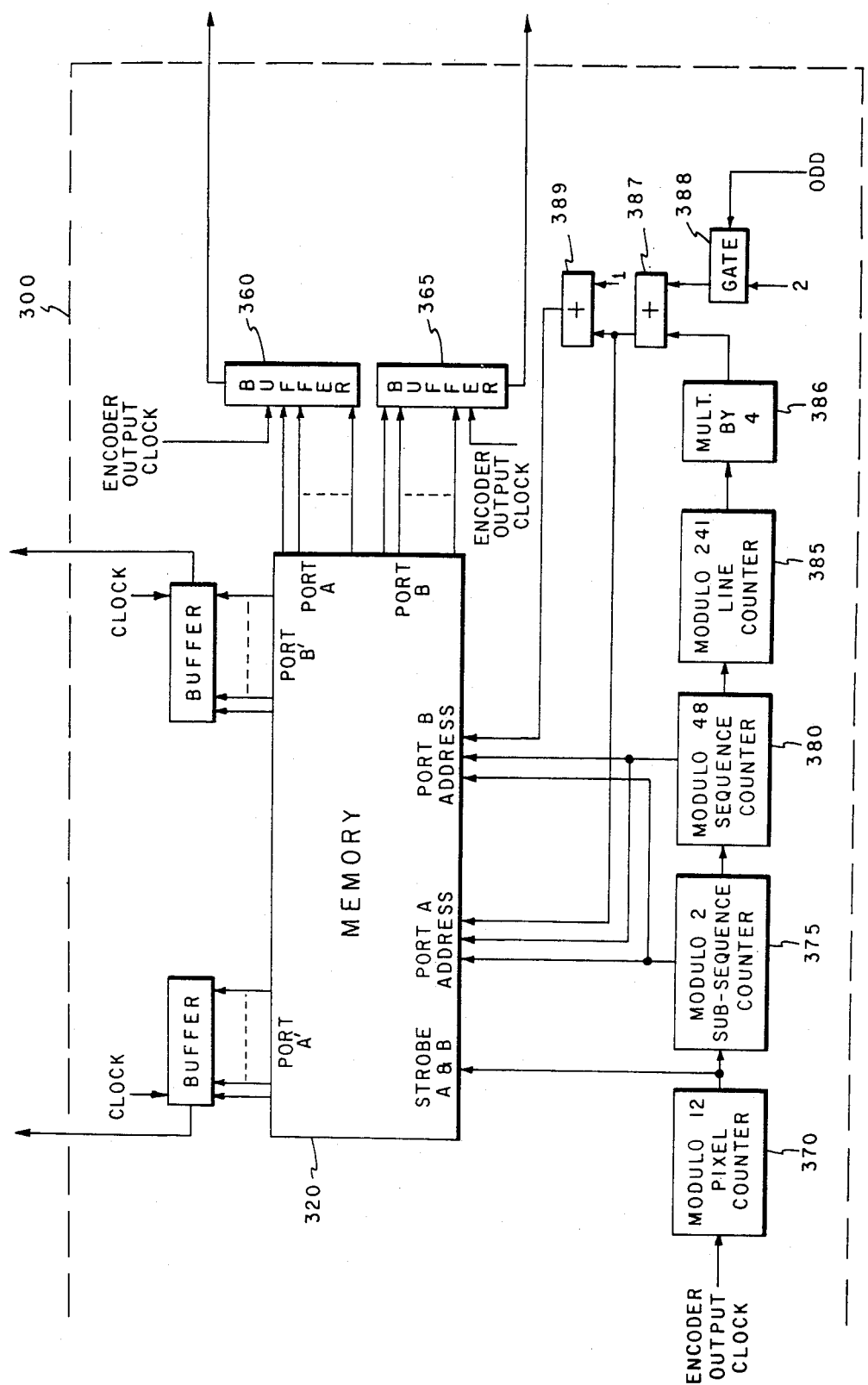
FIG. 5 is a block diagram of a portion of the encoder memory subsystem showing the output control and addressing thereof.

Referring to FIG. 3, there is shown a simplified block diagram of the encoding circuitry 20. The video signal from camera 10 (FIG. 1) is coupled to an analog-to-digital converter 210 which conventionally operates to convert the television signal to digital form. In the present embodiment, each video pixel of a frame is represented by an 8-bit binary signal that is determined by the instantaneous luminance level of the video signal at the particular pixel position. The analog-to-digital converter 210 operates to digitize each pixel at the encoder input clock rate, and couple the 8-bit pixel values to the encoder memory subsystem 300. Reference can also be made to FIGS. 4 and 5 for further detail. In particular, the output of analog-to-digital converter 210 is coupled to the input of a 24-stage serial-in-parallel-out buffer register 310, which is also clocked at the encoder input clock rate. The buffer register 310 is operative to receive twenty-four 8-bit pixel values from the analog-to-digital converter and, when full, the buffer register contents are strobed into the input port of the random access memory 320. In the present embodiment the memory 320 stores one frame of 8-bit pixels of the high resolution video. The memory 320 has a pair of output ports respectively designated as an A port and a B port. The A port is used to output the pixel values of an odd-numbered line, and the B port is used to output the pixel values of the adjacent even-numbered line. In this manner, the pixels of the groups of FIG. 2 are conveniently accessed to produce the desired sum and difference signals. To facilitate fast processing, and as will be described further hereinbelow, the sum and difference signals are formed using sum and difference signal generation digital circuitry 600 that simultaneously processes pixel values from the A and B ports. [An independent pair of ports, designated as an A' port and a B' port can be used for difference signal formation, as will be described hereinbelow.] The output of circuitry 600 is coupled to digital-to-analog converters 301, which converts the sum and difference signals to analog signals that are coupled to the transmit circuitry 30 (FIG. 1).

FIG. 4 illustrates the input control and addressing of the encoder memory subsystem 300. As previously described, pixels are clocked into the buffer register 310 at the encoder input clock rate. A modulo 24 pixel counter 330 is provided to count clock pulses and generate an output when the input buffer register 310 is loaded with the latest 24 8-bit pixel values. The output of counter 330 is applied to strobe the 24 pixel values into the memory 320 via its input port. The output of counter 330 is also coupled to a modulo 48 counter 340 that keeps track of the number of 24-pixel sequences that have been read in per line. Accordingly, the count of sequence counter 340 is a "sequence address"; i.e., a number from 0 to 47 that designates a portion of the address where the latest 24-pixel sequence is to be stored in the memory. The output of sequence counter 340 is also coupled to a modulo 964 line counter that is, accordingly, stepped at the end of each line and which thereby generates the portion of the address which designates the line of pixels being read in. In this manner, it will be understood that a composite address is generated for each sequence of 24 high resolution pixels, so that a full frame of high resolution pixels can be stored at readily retrievable locations of the memory 320.

FIG. 5 illustrates the output control and addressing of the encoder memory subsystem. As noted above, the memory has output ports, designated as port A and port B. When the port A output is operating to read out pixel values of a particular scanline, the port B is used to read out pixel values of the corresponding pixels of the next scanline. This facilitates the generation of the sum and difference signals. Output from each port, in parallel, are twelve consecutive pixel values of a scanline; i.e., one-half of a 24-pixel sequence as described in conjunction with the encoder memory input addressing and control. A port A output buffer register 360 and a port B output buffer register 365 are each 12-stage parallel-in-serial-out registers which operate under control of the encoder output clock.

A modulo 12 counter 370 counts encoder output clock pulses, and thereby generates an output that is used to strobe a sequence of 12 pixels of each of two consecutive scanlines into the parallel-in-serial-out output buffer registers 360 and 365 for port A and port B, respectively. The output of counter 370 is coupled to a modulo 2 sub-sequence counter 375 that keeps track of which half of the originally stored 24 pixel sequence is being addressed. Accordingly, the single bit output of counter 375 is a part of the address input to encoder memory output ports. The counter 375 output is coupled to a modulo 48 sequence counter 380, whose output count is another portion of the address; i.e., the designation of the particular 24-pixel sequence being addressed at both ports. The output of counter 380 is coupled to a modulo 241 line counter 385 whose output is coupled to a multiply-by-four circuit 386. The output of multiplier 386 is coupled to one input of adder 387. The other input to adder 387 is the output of gate 388. The gate 388 has an input representative of the number 2, and is enabled during generation of an odd television field. The output of adder 387 is the line number portion of the port A address, and it is also coupled to another adder 389 which adds 1. The output of adder 389 is the line number portion of the port B address. In operation, the line addressing circuitry just described operates such that the port A line addresses designate the odd lines and the port B addresses designate the even lines. During an even field, the line pairs 0,1 then 4,5 then 8,9 . . . are addressed, and during the odd field the lines 2,3 then 6,7 then 10,11 . . . are addressed at the two ports. In this manner, an interlaced output is obtained by interrogating alternating pairs of lines of the high resolution array. Thus it is seen, that the complete addresses at ports A and B provide consecutively the pixels from successive line pairs of the stored video frame, the pixel values being strobed, 12 bits at a time, into the output buffers 360 and 365.

Figure 6:
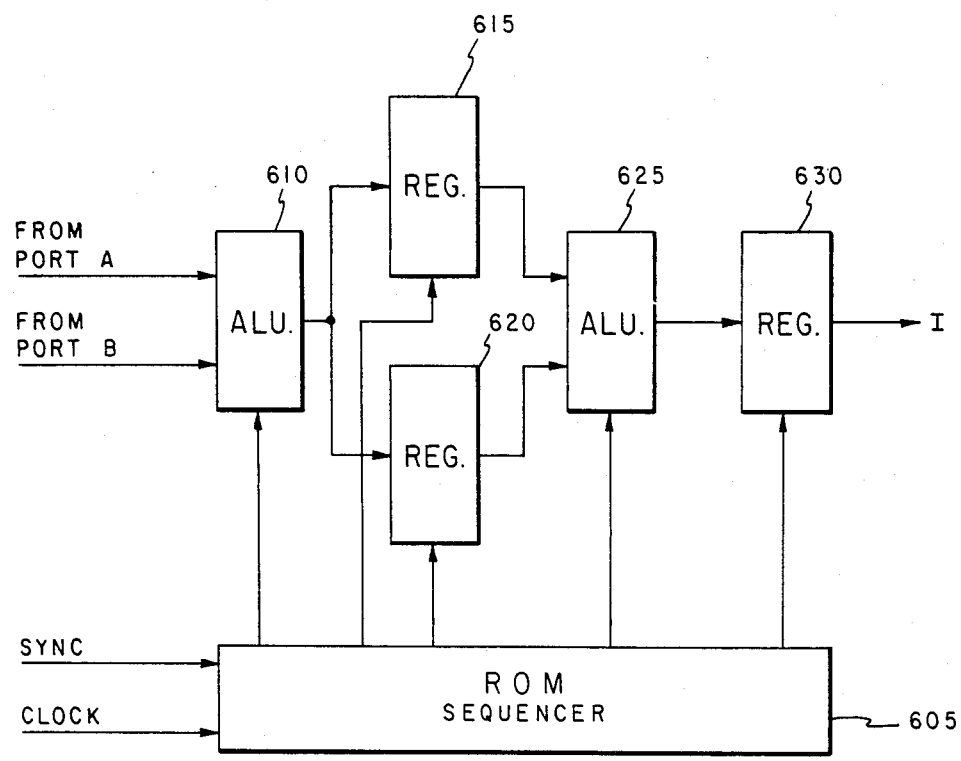
FIG. 6 is a block diagram of the sum signal generation portion of the sum and difference signal generation circuitry of the encoder.

FIG. 6 illustrates the portion of the sum and difference signal generation circuitry 600 used for generating the intensity signal I from the port A and port B outputs as they are clocked serially out of the buffer registers 360 and 365, respectively. The circuitry includes arithmetic logic units 610 and 625, and storage registers 620, 630, and 640. The arithmetic logic unit 610 receives the port A and port B outputs. The output of arithmetic logic unit 610 is coupled to storage registers 615 and 620 whose outputs are, in turn, coupled to the arithmetic logic unit 625. The output of arithmetic logic unit 625 is, in turn, coupled to storage register 630, whose output is the desired sum signal, I, in accordance with the relationship (1) above.

Figure 7:
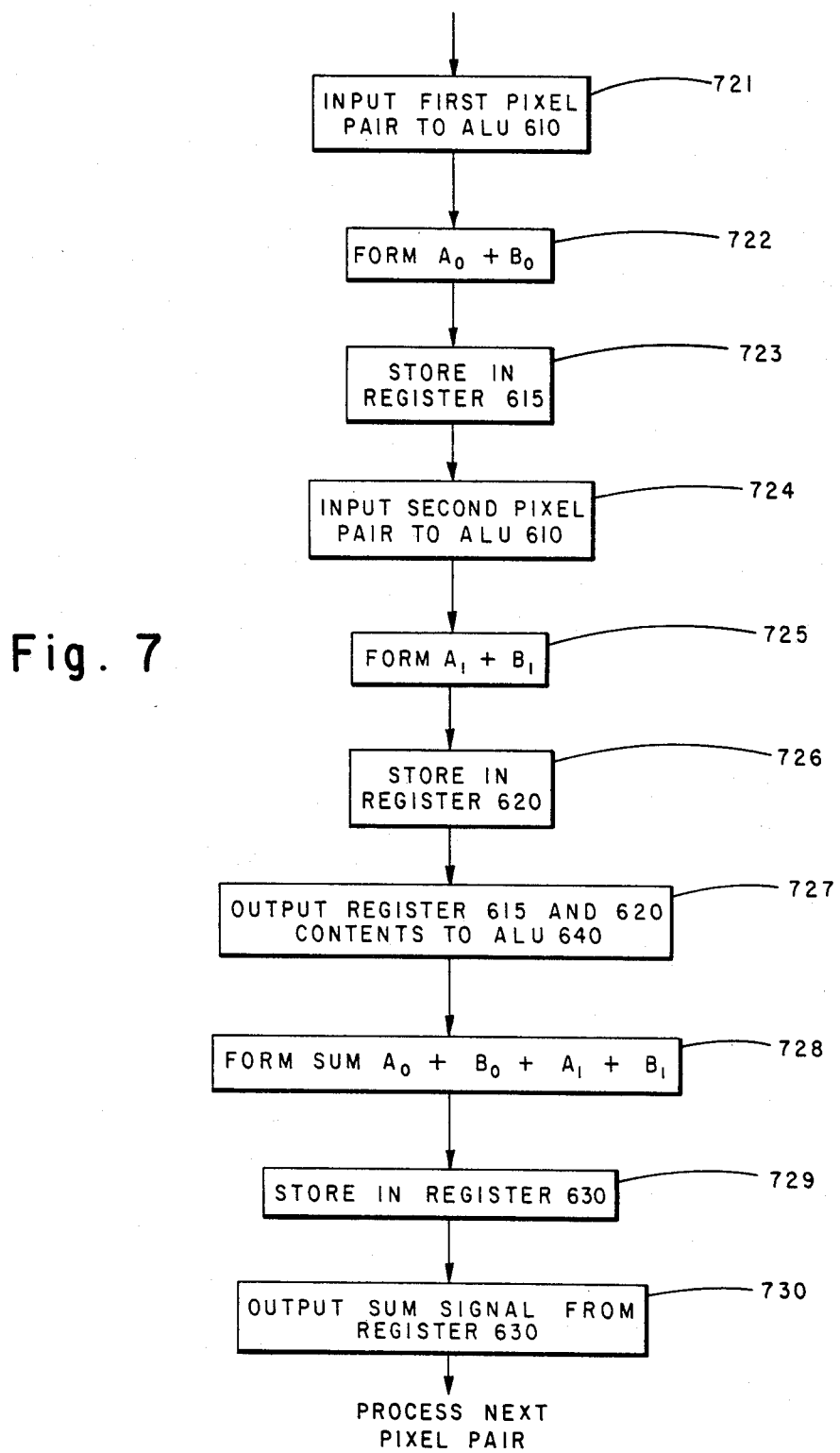
FIG. 7 is a flow diagram for controlling the ROM sequencer of the sum signal generation circuitry of the encoder.

The described arithmetic logic units and storage registers are under control of ROM sequencer 605 which receives the vertical and horizontal synchronizing signals and the encoder output clock signal and generates the control sequence illustrated by the flow diagram of FIG. 7 to obtain the sum set forth in relationships (1). In particular, the first pixel pair from port A and port B is input to the arithmetic logic unit 610, as represented by the block 721. The arithmetic logic unit 610 is controlled to form the sum of this first pixel pair; i.e., to form $(A_0+B_0)$ as illustrated in the group of FIG. 2, and as represented by the block 722. The output of arithmetic logic unit 610 is stored in register 615 (block 723). The second pixel pair of the group is then input to arithmetic logic unit 610 (block 724) which is again controlled to form an addition function (block 725). The result is stored in register 620 (block 726). The outputs of registers 615 and 620 are output to arithmetic logic unit 625 (block 727) which is controlled to form a sum (block 728) in accordance with relationship (1) above. The output of arithmetic logic unit 625 is stored in register 630 (block 729) and output from register 630 (block 730) to serve as the sum signal output I that is coupled to transmit circuitry 30 (e.g. FIG. 1).

Figure 8:
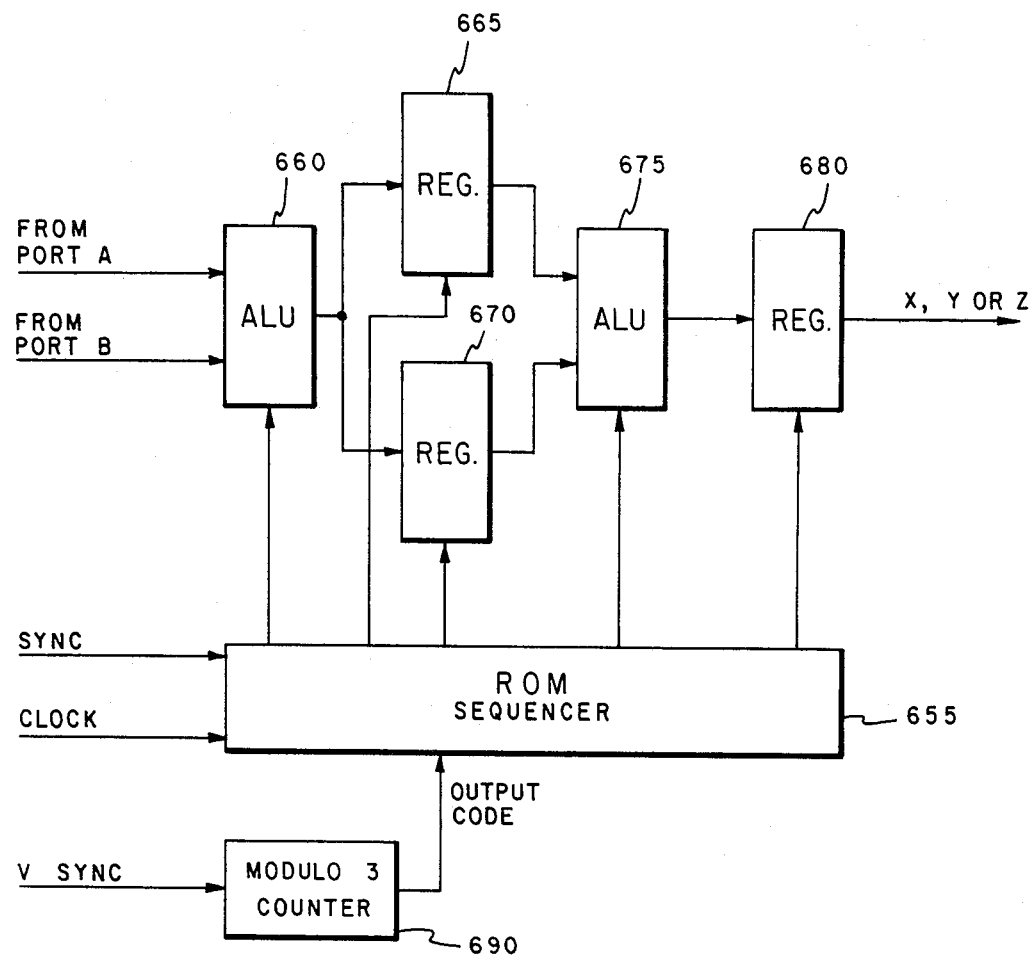
FIG. 8 is a block diagram of the difference signal generation portion of the sum and difference signal generation circuitry of the encoder.

FIG. 8 illustrates the portion of the sum and difference signal generation circuitry 600 (FIG. 3) used for generating the difference signals X, Y and Z from the port A and port B outputs as they are clocked serially out of the buffer registers 360 and 365, respectively. The circuitry includes arithmetic logic units 660 and 675, and storage registers 665, 670 and 680. The arithmetic logic unit 660 receives the port A and port B pixel streams. The output of arithmetic logic unit 660 is coupled to storage registers 665 and 670, whose outputs are, in turn, coupled to the arithmetic logic unit 675. The output of arithmetic logic unit 675 is, in turn, coupled to storage register 680, whose output is, depending upon time, either the X, Y, or Z difference signal in accordance with relationships (2), (3) or (4) above. The described arithmetic logic units and storage registers are under control of ROM sequencer 655, which receives the vertical and horizontal synchronizing signals and the encoder output clock signal, and generates the control sequence illustrated by the flow diagram of FIG. 9 to obtain the desired difference signals. A modulo 3 counter 690 is responsive to alternate vertical synchronizing signals to produce one of three output counts that serve as the code to determine which of the X, Y or Z difference signals is to be generated for a particular frame. This output code is also coupled to the transmit circuitry 30 so that it can be transmitted and used in the decoder circuitry of the receiver in order to distinguish between the difference signals at the decoder.

Figure 9:
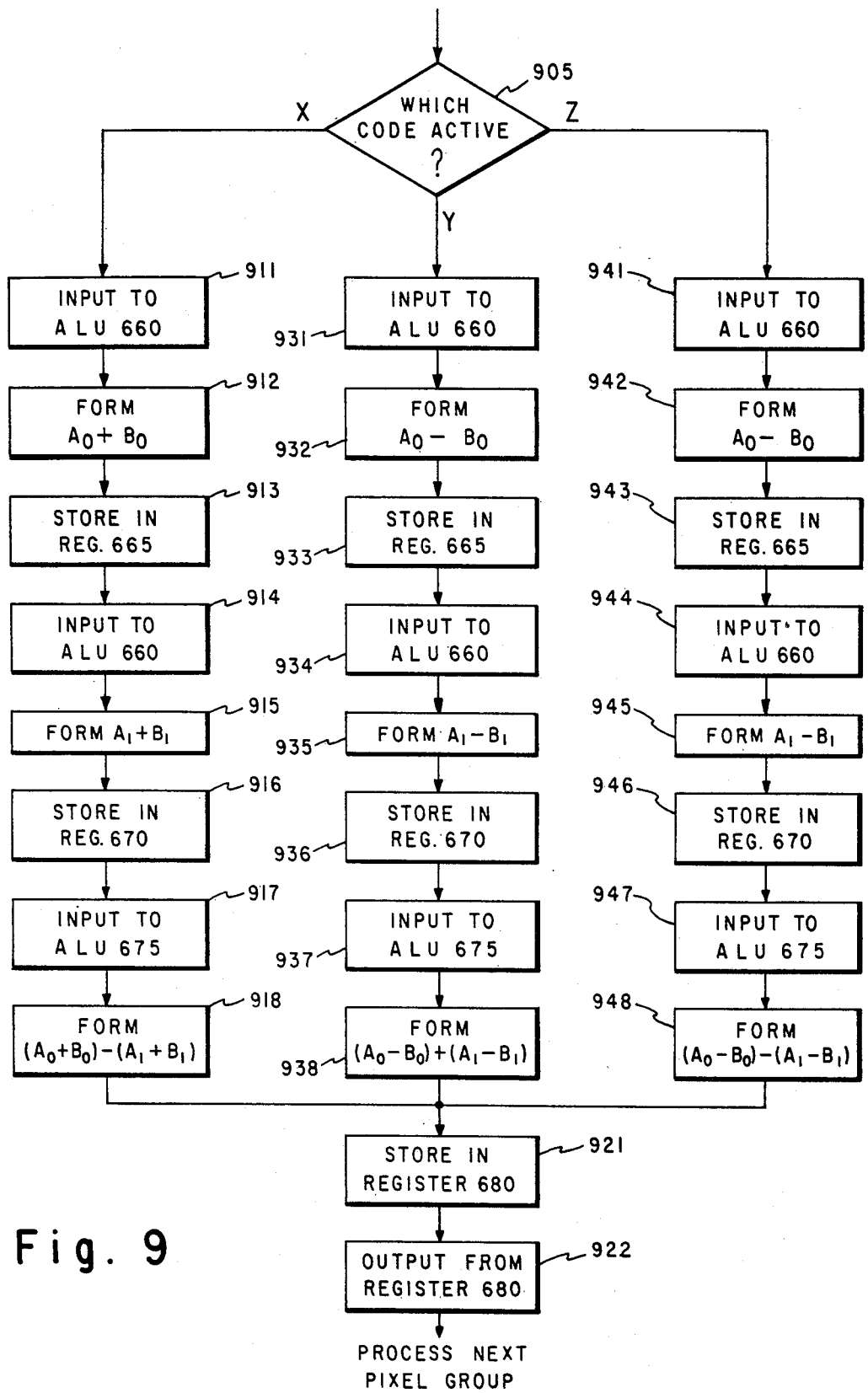
FIG. 9 is a flow diagram for controlling the ROM sequencer of the difference signal generation circuitry of the encoder.

In FIG. 9, decision diamond 905 represents determination of which difference signal code, X, Y or Z, is active. If the X code is active, the block 911 is entered, this block representing the inputting of the first pixel pair from port A and port B to the arithmetic logic unit 660. The arithmetic logic unit 660 is controlled to form the sum of this pixel pair, as represented by the block 912. The output of arithmetic logic unit 660 is stored in register 665 (block 913). The second pixel pair of the group is then input to arithmetic logic unit 660 (block 914), which is again controlled to form an addition function (block 915). The result is stored in register 670 (block 916). The output of registers 665 and 670 are coupled to arithmetic logic unit 675 (block 917) which is controlled to form a difference (block 918). The output of arithmetic logic unit 675 is stored in register 680 (block 921), and output from register 680 (block 922) as the difference signal X that is coupled to transmitter circuitry 30. The process is then repeated for the two pixel pairs of the next group, and the procedure is continued for each scanline pair of the frame. In this manner, it is seen that the X difference signal is formed in accordance with the relationship (2) above.

During the next frame, when the Y code is active, the branch beginning with block 931 is operative. In particular, the first pixel pair is input to the arithmetic logic unit 660 (block 931) which is controlled to form the difference of this pixel pair, i.e. ($A_0-B_0$) as represented by block 932. The output of arithmetic logic unit 660 is stored in register 665 (block 934). The second pixel pair of the group is then input to arithmetic logic unit 660 (block 934) which is again controlled to perform a subtraction (block 935). The result is stored in register 670 (block 936). The output of registers 665 and 670 are output to arithmetic logic unit 675 which is controlled to form a sum (block 938). Blocks 921 and 922 function, as before, to control the storage in register 680 and the output from register 680 of the Y difference signal, consistent with the relationship set forth above in equation (3).

During the next frame, when the Z code is active, the branch beginning with block 941 is operative. The first pixel pair is input to the arithmetic logic unit 660 (block 941) which is controlled to form the difference of this pixel pair, i.e. ($A_0-B_0$) as represented by block 942. The output of arithmetic logic unit 660 is stored in register 665 (block 944). The second pixel pair of the group is then input to arithmetic logic unit 660 (block 944) which is again controlled to perform a subtraction (block 945). The result is stored in register 670 (block 946). The output of registers 665 and 670 are output to arithmetic logic unit 675 which is controlled to perform a subtraction (block 948). Blocks 921 and 922 function, as before, to control the storage in register 680 and the output from register 680 of the Z difference signal, consistent with the relationship set forth above in equation (4).

Figure 10:
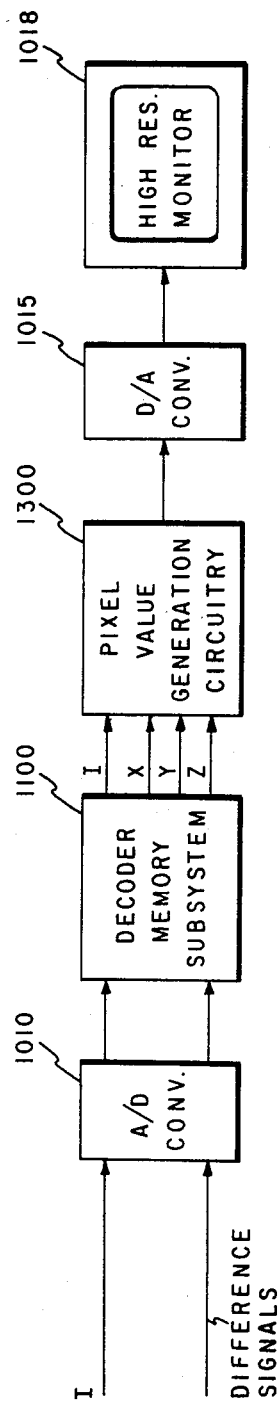
FIG. 10 is a block diagram of the decoding circuitry of FIG. 1.

Referring to FIG. 10, there is shown a simplified block diagram of the decoding circuitry 50 (FIG. 1). The sum and difference signals recovered by receiver circuitry 40 (FIG. 1) are coupled to analog-to-digital converters 1010 which operate to convert the sum and difference signals to digital form. The digitized signals are coupled to the decoder memory subsystem 1100 which is operative in the present embodiment to produce simultaneously, at four output ports, the latest digital information representative of the sum signal (I) and the three difference signals (X, Y and Z). These signals are combined by pixel value generation circuitry 1300, in accordance with the relationships (5), (6), (7) and (8), to recover the high resolution pixel values originally stored at the encoder. The output of circuitry 1300 is coupled to digital-to-analog converter 1015 which converts the digital signal output from circuitry 1300 into analog form suitable for display on high resolution monitor 1018.

Figure 11:
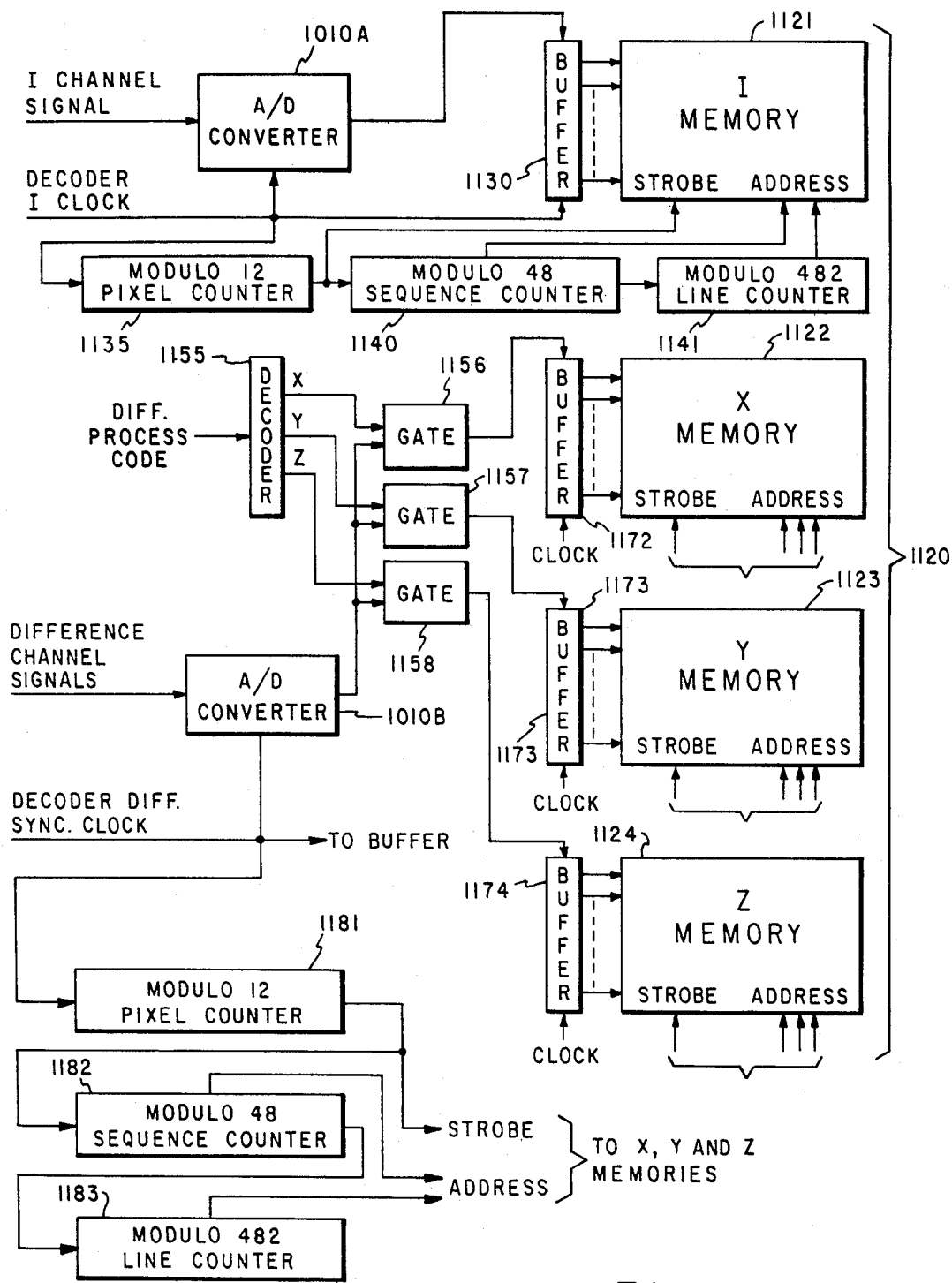
FIG. 11 is a block diagram of a portion of the decoder memory subsystem, showing the input control and addressing thereof.

FIG. 11 illustrates the input control and addressing of the decoder memory subsystem 1100. The memory portion thereof is organized in the present embodiment as four two-port memory blocks of random access memory, each capable of storing 576 (12×48) 8-bit pixel values per line, by 482 lines. The four portions of the decoder memory are called the intensity memory 1121, the X difference signal memory 1122, Y difference signal memory 1123, and the Z difference signal memory 1124. These portions of the memory are operative to respectively store, via their input ports, the signals designated I, X, Y and Z, these signals then being read out at the respective output ports of the memory portions and combined in a manner to be described.

The intensity channel signal I is received by analog-to-digital converter 1010a which converts the analog signal to 8-bit digital pixel values at a decoder intensity channel clock rate that is typically the same as the encoder output clock rate. An input buffer register 1130 is a serial-in-parallel-out register that receives twelve 8-bit pixel values which are strobed in parallel into the memory 1121. A modulo 12 counter 1135 counts the clock pulses and produces a strobe signal that is operative to strobe twelve pixels of information from the buffer 1130 into the memory 1121. The output of modulo 12 counter 1135 is counted by a modulo 48 counter 1140, the count of which comprises the sequence address portion of the address coupled to memory 1121. The output of modulo 48 counter 1140 is coupled to a modulo 482 counter 1141 whose count constitutes the line address input to memory 1121. Accordingly, each group of twelve 8-bit pixels is strobed into an appropriate sequence address and line address in the decoder intensity memory 1121.

The difference channel signal is coupled to an analog-to-digital converter 1010b which converts the difference channel signal to 8-bit pixel values at a decoder difference channel clock rate that may be the same or different than the decoder intensity channel clock rate. The difference channel signal is also coupled to a decoder 1155 which detects the difference process code (X, Y or Z), as previously described, to determine which of the X, Y or Z difference signals is active during the present frame. The output of decoder 1155 couples an enabling signal to one of three gates; i.e., an X gate 1156, a Y gate 1157 or a Z gate 1158, depending upon which difference signal is active. The decoded signal is also coupled to the X, Y and Z memories as an address select indication. The 8-bit pixel value output from the analog-to-digital converter 1010b is coupled through the enabled gate 1156, 1157, or 1158 to the input of serial-in-parallel-out buffer register 1172, 1173, or 1174.

The input address generation for the X, Y, and Z portions of the decoder memory 1122, 1123 and 1124 is similar to the address generation for the intensity memory section 1121. (If the input clocks are selected as being the same, the input address generation for the X, Y and Z memory sections may be in common with the input address generation for the intensity memory section.) The clock signal is coupled to a modulo 12 counter 1181 whose output is the strobe signal used to strobe the contents of buffers 1172, 1173, or 1174 into their respective memories. However, only the one memory whose memory portion select address line is active will identify an address into which the pixel values are strobed. The output of modulo 12 counter 1181 is coupled to a modulo 48 counter 1182 whose count constitutes the sequence address for the sequence of twelve pixels being strobed in, as described above. Also, the output of the modulo 48 counter 1182 is coupled to a modulo 482 counter 1183 whose output, again, serves as a line address. The strobe and address signals are coupled to each of the memories 1121, 1122 and 1123, along with the memory portion select address. Accordingly, it is seen that the decoder memory continuously stores the intensity channel signal in the decoder memory section 1121 and sequentially stores frames of the X difference signal, the Y difference signal and the Z difference signal in the memory sections 1122, 1123 and 1124, with each of the difference signal memories being updated at a slower information rate; i.e., once every three video frames in the present exemplary embodiment.

Figure 12:
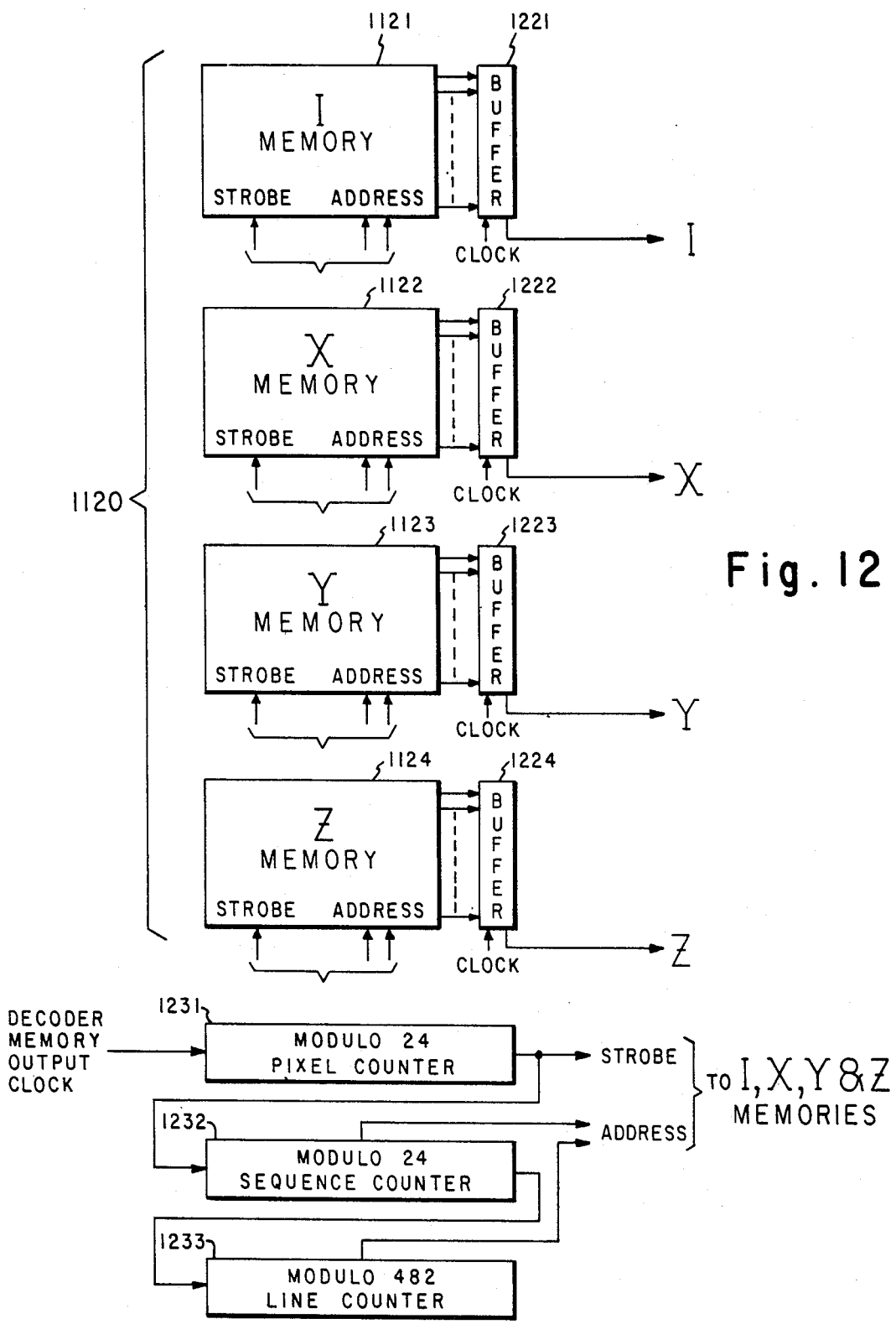
FIG. 12 is a block diagram of a portion of the decoder memory subsystem, showing the output control and addressing thereof.

Referring to FIG. 12, there is shown the receiver memory output ports and output addressing. The memory portions 1121, 1122, 1123, and 1124 each have 24-pixel parallel outputs that are respectively coupled to parallel-in-serial-out buffer registers 1221, 1222, 1223, and 1224, whose serial outputs are 8-bit digital signals respectively representative of the intensity channel signal I and the three difference channel signals, X, Y and Z.

A modulo 24 counter 1231 counts decoder memory output clock pulses, which are at a higher rate (for example, twice the rate in this embodiment) than the decoder memory input clocks. The output of the modulo 24 counter 1231 is used as a strobe signal to strobe the 24 pixels in parallel from the memories 1121, 1122, 1123, and 1124 into their respective output buffer registers 1221, 1222, 1223, and 1224. The output of the modulo 24 counter 1231 is also coupled to the input of the modulo 24 counter 1232 whose count is utilized as the sequence address to the four memories 1121, 1122, 1123 and 1124. The output of modulo 24 counter 1232 is coupled to a modulo 482 counter 1233 whose count is utilized as a line address to the memories 1121, 1122, 1123 and 1124. Accordingly, during each frame period, the memories 1121, 1122, 1123 and 1124 output, from their respective buffers, the latest stored frames of I, X, Y and Z information. As described, the I information is "updated" every frame, and the X, Y and Z difference signal information is "updated" every three frames, so the outputs X, Y and Z are each read out three times redundantly before "new" information is read out.

Figure 13:
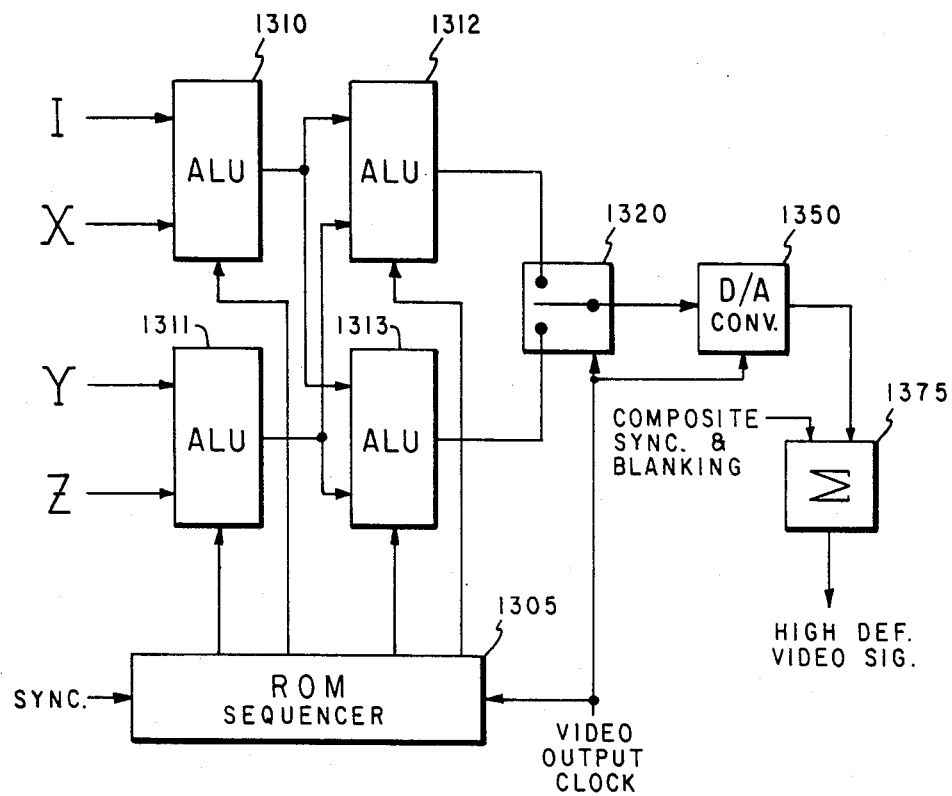
FIG. 13 is a block diagram of the pixel value generation circuitry of the decoder.

Referring to FIG. 13, there is shown a block diagram of the pixel value generation circuitry 1300 (FIG. 10) of the decoder which operates on the outputs of the decoder memory subsystem to reproduce the original pixel values in accordance with relationships (1) through (4) above. Four arithmetic logic units 1310, 1311, 1312 and 1313 are employed, under control of ROM sequencer 1305. The arithmetic logic unit 1310 receives the sum signal I and one of the difference signals X, and the arithmetic logic unit 1311 receives the difference signals Y and Z. The output of arithmetic logic unit 1310 is coupled to an input of each of the arithmetic logic units 1312 and 1313, and the output of arithmetic logic unit 1311 is coupled to the other input of each of the arithmetic logic units 1312 and 1313. The outputs of the arithmetic logic units 1312 and 1313 are respectively coupled to two inputs of solid state switch 1320, the output of switch 1320 being coupled to the input of digital-to-analog converter 1350. The output of converter 1350 is coupled to a summing circuit 1375 which also receives locally generated composite sync and blanking (which, as previously noted, is synchronized with the received television signal) to produce a composite output high definition television signal. The switch 1320 and the digital-to-analog converter 1350 operate at the decoder video output clock rate which is typically the same clock rate as the encoder input clock rate that was used to originally clock in the high resolution pixel information. ROM sequencer 1305, which receives sync and the video output clock, controls the status of the arithmetic logic units.

Figure 14:
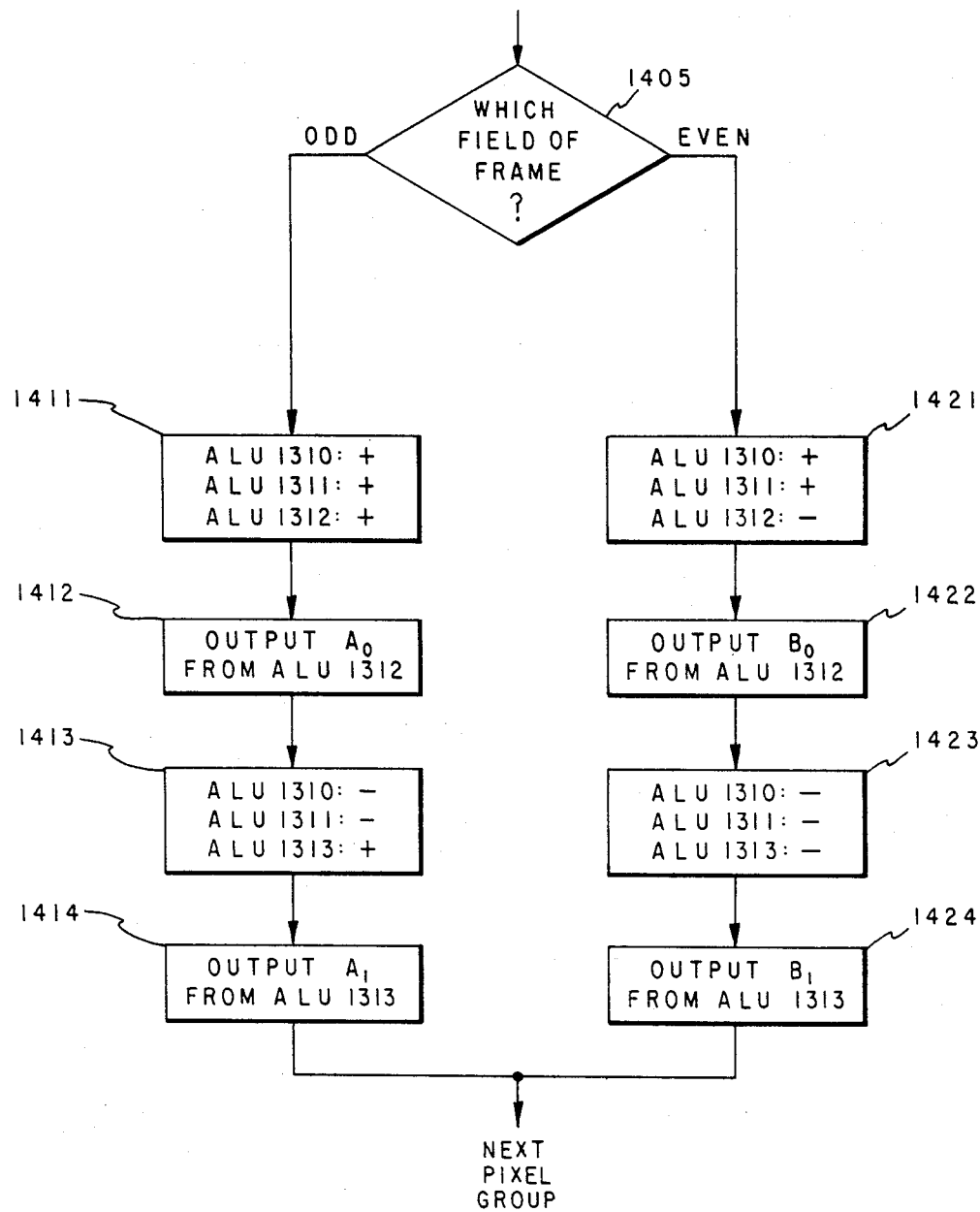
FIG. 14 is a flow diagram for controlling the ROM sequencer of the decoder pixel value generation circuitry.

FIG. 14 illustrates the routine of the ROM sequencer 1305. Decision diamond 1405 represents an inquiry as to which field of a frame is being generated, the field information being available to the ROM sequencer from the sync and blanking circuitry of the receiver. If it is the first field of the frame (an odd field), and odd output lines are to be generated, it will be understood that pixels $A_0$ and $A_1$ of each pixel group are to be generated (see FIG. 2). Pixel $A_0$ is generated in accordance with relationship (5). The block 1411 represents the control of the arithmetic logic units 1310, 1311 and 1312 to each perform an addition function, so that the output of arithmetic logic unit 1312 represents $A_0$ in accordance with relationship (5) (block 1412). The solid state switch 1320, which is clocked at the same rate as the ROM sequencer by the decoder video output clock, is synchronized to sample the output of the arithmetic logic unit 1312 for pixel $A_0$ of each group and to sample the output of the arithmetic logic unit 1313 for pixel $A_1$ of each group. To process the next pixel, upon occurrence of the next clock pulse, the arithmetic logic units 1310 and 1311 are controlled to perform a subtraction, and the arithmetic logic unit 1313 is controlled to perform an addition (block 1413), so that the output of the arithmetic logic unit (block 1414) is consistent with the desired expression for $A_1$ in accordance with relationship (6). This signal is output from arithmetic logic unit 1313 as the solid state switch 1320 samples the output of arithmetic logic unit 1313. The adjacent pixel pairs of each odd line continue to be processed in this way. When the second (even) field of the frame is being generated, the outputs of arithmetic logic units 1312 and 1313, in similar synchronism with operation of the solid state switch 1320, are used to generate signals for $B_0$ and $B_1$ respectively, consistent with relationships (7) and (8).

In particular, for the pixel $B_0$, the arithmetic logic units 1310 and 1311 are controlled to perform an addition, and the arithmetic logic unit 1312 is controlled to perform a subtraction (block 1421), so that the output $B_0$ pixel from arithmetic logic unit 1312 (block 1422) is in accordance with the expression (7). As described above, this pixel value is output to the solid state switch 1320 in synchronism with the switch sampling the output from arithmetic logic unit 1312. When the solid state switch is receiving the output of arithmetic logic unit 1313, the arithmetic logic units 1310, 1311, and 1313 are all controlled to perform a subtraction (block 1423), consistent with the relationship (8), so that the appropriate value for the pixel $B_1$ of the group can be output (block 1424).

In the described exemplary embodiment, the encoder generates a full complement of difference signals at one-third the rate at which the low resolution intensity (sum) signal is generated. Since different individual ones of the difference signals are generated concurrently with the intensity signal, the signals from the output ports A and B (FIG. 5) can be utilized to generate both the sum and the difference signals (using the combining circuitry of FIGS. 6 and 8). However, it may be preferable to save additional bandwidth by further slowing down the rate of generation of the difference signals to the full extent allowed by visual perception considerations, as discussed above. In FIG. 5, the ports designated A' and B', and their associated clocks, allow independent generation of the difference signals at any desired rate.

Also, in the described embodiment hereof, the decoder is implemented using memories which store the incoming intensity (sum) and difference signals, and then read out the stored signals (redundantly, at least in the case of the difference signals) to combining circuitry which generates the high resolution pixel values. It is important to note, however, that the decoder could alternatively be implemented by combining previously stored high resolution pixel values (i.e., from a previous frame) with the sum and difference signals as they are received.

The exemplary embodiment hereof has been described in terms of a monochrome system, but it will be understood that the principles of the invention apply to color systems. For a broadcast television application, color could be encoded on the 525 line carrier in the usual way. For high definition reception a higher resolution chroma signal would be used. For example, the I and Q coordinates can be transmitted at 525 line resolution both horizontally and vertically. The information need not be generated (or transmitted) at 30 frames per second, lower chromaticity frame rates being preferred to save bandwidth. Difference signals containing the high resolution chromaticity information may be employed and sent frame sequentially.

As noted above, various pixel group configurations, which may be square, rectangular, linear, or irregular, can be used, consistent with the principles of the present invention. The number of difference signals necessary in each case will be a function of the number of pixels in a group.

It will be recognized by those skilled in the art that further variations can be implemented within the spirit and scope of the invention. For example, if required by broadcast standards a "high resolution signal killer" could be utilized in high definition receivers when low resolution broadcasts are being received. Also, while a double interlace scheme has been illustrated, it will be understood that alternatives, such as triple interlace, can be used. Finally, it is noted that integrated circuit technology can be employed to implement some or all of the decoder, such as for home receiver use.

I claim:

1. Apparatus for encoding and decoding a video signal, comprising:
   (A) an encoder, including:
   means for storing an input video frame as an array of pixel values;
   means for interrogating the stored array and for generating (i) a sum signal representative of the sum of the pixel values in a group of pixels, and (ii) a difference signal representative of the difference between the total of the pixel values of some of the pixels in the group and the total of the pixel values of other pixels in the group; the sum signal and the difference signal being generated for a multiplicity of groups which cover the video frame;
   said sum signal being generated at a relatively high information rate, and said difference signal being generated at a relatively low information rate;
   (B) a decoder, including means for combining the sum and difference signals to obtain an output pixel value for each pixel of an output video frame.

2. Apparatus as defined by claim 1, wherein said decoder includes means for storing the sum signal and means for storing the difference signal; and wherein said combining means is operative to combine the stored sum and difference signals.

3. Apparatus as defined by claim 1, wherein said pixel values are digital pixel values, and further comprising means for converting the encoded sum signal and the encoded difference signal into analog signals; means for transmitting the analog signals; means for receiving the analog signals; and means for recovering the digital sum and difference signals before the decoding thereof.

4. Apparatus as defined by claim 2, wherein said pixel values are digital pixel values, and further comprising means for converting the encoded sum signal and the encoded difference signal into analog signals; means for transmitting the analog signals; means for receiving the analog signals; and means for recovering the digital sum and difference signals before the decoding thereof.

5. Apparatus as defined by claim 1, wherein the number of pixels per output video frame of the decoder is substantially the same as the number of pixels in the input video frame array, and the pixel values of the output video frame correspond to pixel values of corresponding pixels of the input video frame array.

6. Apparatus as defined by claim 2, wherein the number of pixels per output video frame of the decoder is substantially the same as the number of pixels in the input video frame array, and the pixel values of the output video frame correspond to pixel values of corresponding pixels of the input video frame array.

7. Apparatus as defined by claim 4, wherein the number of pixels per output video frame of the decoder is substantially the same as the number of pixels in the input video frame array, and the pixel values of the output video frame correspond to pixel values of corresponding pixels of the input video frame array.

8. Apparatus as defined by claim 1, further comprising means for converting output pixel values to an output analog video signal.

9. Apparatus as defined by claim 2, further comprising means for converting output pixel values to an output analog video signal.

10. Apparatus as defined by claim 4, further comprising means for converting output pixel values to an output analog video signal.

11. Apparatus as defined by claim 7, further comprising means for converting output pixel values to an output analog video signal.

12. Apparatus for encoding and decoding a video signal, comprising:
    (A) an encoder, including:
    means for storing input video frames as arrays of pixel values;
    means for interrogating the stored arrays and for generating: (i) a sum signal representative of the sum of the pixel values in a group of pixels, and (ii) a plurality of distinct difference signals representative of the difference between the total of the pixel values of some of the pixels in the group and the total of pixel values of other pixels in the group; the sum signal and each difference signal being generated for a multiplicity of groups which cover a video frame; the sum signal being generated at a relatively high information rate and each of the difference signals being generated at a relatively low information rate;
    (B) a decoder, including means for combining the sum and difference signals to obtain an output pixel value for each pixel of an output video frame.

13. Apparatus as defined by claim 12, wherein said decoder includes means for storing the sum signal and means for storing the difference signals; and wherein said combining means is operative to combine the stored sum and difference signals.

14. Apparatus as defined by claim 12, wherein said pixel values are digital pixel values, and further comprising means for converting the encoded sum signal and the encoded difference signals into analog signals; means for transmitting the analog signals; and means for recovering the digital sum and difference signals before the decoding thereof.

15. Apparatus as defined by claim 13, wherein said pixel values are digital pixel values, and further comprising means for converting the encoded sum signal and the encoded difference signals into analog signals; means for transmitting the analog signals; and means for recovering the digital sum and difference signals before the decoding thereof.

16. Apparatus as defined by claim 12, wherein the number of pixels in output video frames of the decoder is substantially the same as the number of pixels in the input video frame arrays, and the pixel values of output video frames correspond to pixel values of corresponding pixels of the input video frame arrays.

17. Apparatus as defined by claim 13, wherein the number of pixels in output video frames of the decoder is substantially the same as the number of pixels in the input video frame arrays, and the pixel values of output video frames correspond to pixel values of corresponding pixels of the input video frame arrays.

18. Apparatus as defined by claim 15, wherein the number of pixels in output video frames of the decoder is substantially the same as the number of pixels in the input video frame arrays, and the pixel values of output video frames correspond to pixel values of corresponding pixels of the input video frame arrays.

19. Apparatus as defined by claim 12, further comprising means for converting output pixel values to an output analog video signal.

20. Apparatus as defined by claim 13, further comprising means for converting output pixel values to an output analog video signal.

21. Apparatus as defined by claim 18, further comprising means for converting output pixel values to an output analog video signal.

22. Apparatus for encoding and decoding a video signal, comprising:
(A) an encoder, including:
means for storing input video frames as arrays of pixel values;
means for interrogating the stored arrays for a series of successive frames and for generating: (i) a sum signal representative of the sum of the pixel values in a group of pixels, and (ii) a plurality of distinct difference signals representative of the difference between the total of the pixel values of some of the pixels in the group and the total of pixel values of other pixels in the group; the sum signal and each difference signal being generated for a multiplicity of groups which cover a video frame; the sum signal being generated for each frame of the series and a distinct difference signal being generated for each frame of the series; whereby the sum signal is generated at a relatively high information rate and each of the difference signals is generated at a relatively low information rate;
(B) a decoder, including means for combining the sum and difference signals to obtain an output pixel value for each pixel of an output video frame.

23. Apparatus as defined by claim 22, wherein said decoder includes means for storing the sum signal and means for storing the difference signals; and wherein said combining means is operative to combine the stored sum and difference signals.

24. Apparatus as defined by claim 22, wherein said pixel values are digital pixel values, and further comprising means for converting the encoded sum signal and the encoded difference signals into analog signals; means for transmitting the analog signals; and means for recovering the digital sum and difference signals before the decoding thereof.

25. Apparatus as defined by claim 23, wherein said pixel values are digital pixel values, and further comprising means for converting the encoded sum signal and the encoded difference signals into analog signals; means for transmitting the analog signals; and means for recovering the digital sum and difference signals before the decoding thereof.

26. Apparatus as defined by claim 24, wherein said means for transmitting said analog signals includes coding means for identifying the individual difference signals when the difference signals are recovered.

27. Apparatus as defined by claim 25, wherein said means for transmitting said analog signals includes coding means for identifying the individual difference signals when the difference signals are recovered.

28. Apparatus as defined by claim 26, wherein the stored difference signals of the decoder are stored and restored sequentially in the same order they were generated at the encoder.

29. Apparatus as defined by claim 27, wherein the stored difference signals of the decoder are stored and restored sequentially in the same order they were generated at the encoder.

30. Apparatus as defined by claim 22, wherein the number of pixels in output video frames of the decoder is substantially the same as the number of pixels in the input video frame arrays, and the pixel values of output video frames correspond to pixel values of corresponding pixels of the input video frame arrays.

31. Apparatus as defined by claim 23, wherein the number of pixels in output video frames of the decoder is substantially the same as the number of pixels in the input video frame arrays, and the pixel values of output video frames correspond to pixel values of corresponding pixels of the input video frame arrays.

32. Apparatus as defined by claim 25, wherein the number of pixels in output video frames of the decoder is substantially the same as the number of pixels in the input video frame arrays, and the pixel values of output video frames correspond to pixel values of corresponding pixels of the input video frame arrays.

33. Apparatus as defined by claim 29, wherein the number of pixels in output video frames of the decoder is substantially the same as the number of pixels in the input video frame arrays, and the pixel values of output video frames correspond to pixel values of corresponding pixels of the input video frame arrays.

34. Apparatus as defined by claim 22, further comprising means for converting output pixel values to an output analog video signal.

35. Apparatus as defined by claim 23, further comprising means for converting output pixel values to an output analog video signal.

36. Apparatus as defined by claim 25, further comprising means for converting output pixel values to an output analog video signal.

37. Apparatus for decoding an encoded video signal representative of input video frames digitized as an array of pixel values, the encoded signal including a sum signal representative of the sum of pixel values in a group of pixels, and a plurality of distinct difference signals representative of the difference between the total of the pixel values of some of the pixels in the group and the total of the pixel values of other pixels in the group, the sum signal and each difference signal being generated for a multiplicity of groups which cover a video frame, the sum signal being generated at a relatively high information rate and each of the difference signals being generated at a relatively low information rate; the decoding apparatus comprising:

means for storing the sum signal;
means for storing each of the difference signals;
means for combining the sum and difference signals for corresponding groups of pixels to obtain a pixel value for each pixel of an output video frame corresponding to the pixel value of the corresponding pixel of the input array.

38. Apparatus as defined by claim 37, further comprising means for converting output pixel values to an output analog video signal.

39. A decoding apparatus for use in a system for encoding and decoding a video signal, the encoding portion of the system including means for storing input video frames as arrays of digital pixel values; and means for interrogating the stored arrays for a series of successive frames and for generating: (i) a sum signal representative of the sum of the pixel values in a group of pixels, and (ii) a plurality of distinct difference signals representative of the difference between the total of the pixel values of some of the pixels in the group and the total of pixel values of other pixels in the group; the sum signal and each difference signal being generated for a multiplicity of groups which cover a video frame; the sum signal being generated for each frame of the series and a distinct difference signal being generated for each frame of the series; whereby the sum signal is generated at a relatively high information rate and each of the difference signals is generated at a relatively low information rate; the decoding apparatus comprising:

means for storing the sum signal;
means for storing each of the difference signals; and
means for combining the sum and difference signals for corresponding groups of pixels to obtain a pixel value for each pixel of an output video frame corresponding to the pixel value of the corresponding pixel of the input array.

40. Apparatus as defined by claim 39, further comprising means for converting output pixel values to an output analog video signal.

41. For use in a system for encoding and decoding a video signal, an encoding apparatus comprising:

means for storing input video frames as arrays of digital pixel values; and
means for interrogating the stored arrays and for generating: (i) a sum signal representative of the sum of the pixel values in a group of pixels, and (ii) a plurality of distinct difference signals representative of the difference between the total of the pixel values of some of the pixels in the group and the total of pixel values of other pixels in the group; the sum signal and each difference signal being generated for a multiplicity of groups which cover a video frame; the sum signal being generated at a relatively high information rate and each of the difference signals being generated at a relatively low information rate.

42. Apparatus as defined by claim 41, further comprising means for converting the encoded sum signal and the encoded difference signals into analog signals; and means for transmitting the analog signals.

43. For use in a system for encoding and decoding a video signal, an encoding apparatus comprising:

means for storing input video frames as arrays of digital pixel values; and
means for interrogating the stored arrays for a series of successive frames and for generating: (i) a sum signal representative of the sum of the pixel values in a group of pixels, and (ii) a plurality of distinct difference signals representative of the difference between the total of the pixel values of some of the pixels in the group and the total of pixel values of other pixels in the group; the sum signal and each difference signal being generated for a multiplicity of groups which cover a video frame; the sum signal being generated for each frame of the series and a distinct difference signal being generated for each frame of the series; whereby the sum signal is generated at a relatively high information rate and each of the difference signals is generated at a relatively low information rate.

44. Apparatus as defined by claim 43, further comprising means for converting the encoded sum signal and the encoded difference signals into analog signals; and means for transmitting the analog signals.

45. A method for encoding and decoding a video signal, comprising the steps of:

(A) forming encoded signals, by:
storing an input video frame as an array of pixel values;
interrogating the stored array and generating (i) a sum signal representative of the sum of the pixel values in a group of pixels, and (ii) a difference signal representative of the difference between the total of the pixel values of some of the pixels in the group and the total of the pixel values of other pixels in the group; the sum signal and the difference signal being generated for a multiplicity of groups which cover the video frame;
said sum signal being generated at a relatively high information rate, and said difference signal being generated at a relatively low information rate;
(B) decoding the encoded signals by combining the sum and difference signals to obtain an output pixel value for each pixel of an output video frame.

46. The method as defined by claim 45, wherein said decoding includes storing the sum signal, storing the difference signal, and combining the stored sum and difference signals.

47. The method as defined by claim 45, wherein said pixel values are digital pixel values, and further comprising the steps of: converting the encoded sum signal and the encoded difference signal into analog signals; transmitting the analog signals; receiving the analog signals; and recovering the digital sum and difference signals before the decoding thereof.

48. The method as defined by claim 46, wherein said pixel values are digital pixel values, and further comprising the steps of: converting the encoded sum signal and the encoded difference signal into analog signals; transmitting the analog signals; receiving the analog signals; and recovering the digital sum and difference signals before the decoding thereof.

49. The method as defined by claim 45, wherein the number of pixels per decoded output video frame is substantially the same as the number of pixels in the input video frame array, and the pixel values of the output video frame correspond to pixel values of corresponding pixels of the input video frame array.

50. The method as defined by claim 46, wherein the number of pixels per decoded output video frame is substantially the same as the number of pixels in the input video frame array, and the pixel values of the output video frame correspond to pixel values of corresponding pixels of the input video frame array.

51. The method as defined by claim 48, wherein the number of pixels per decoded output video frame is substantially the same as the number of pixels in the input video frame array, and the pixel values of the output video frame correspond to pixel values of corresponding pixels of the input video frame array.

52. The method as defined by claim 45, further comprising the step of converting output pixel values to an output analog video signal.

53. The method as defined by claim 46, further comprising the step of converting output pixel values to an output analog video signal.

54. The method as defined by claim 48, further comprising the step of converting output pixel values to an output analog video signal.

55. The method as defined by claim 51, further comprising the step of converting output pixel values to an output analog video signal.

56. A method for encoding and decoding a video signal, comprising the steps of:
(A) forming encoded signals, by:
storing input video frames as arrays of pixel values;
interrogating the stored arrays and generating: (i) a sum signal representative of the sum of the pixel values in a group of pixels, and (ii) a plurality of distinct difference signals representative of the difference between the total of the pixel values of some of the pixels in the group and the total of pixel values of other pixels in the group; the sum signal and each difference signal being generated for a multiplicity of groups which cover a video frame; the sum signal being generated at a relatively high information rate and each of the difference signals is generated at a relatively low information rate;
(B) decoding the encoded signals by combining the sum and difference signals to obtain an output pixel value for each pixel of an output video frame.

57. The method as defined by claim 56, wherein said decoding includes storing the sum signal, storing the difference signals, and combining the stored sum and difference signals.

58. The method as defined by claim 56, wherein said pixel values are digital pixel values, and further comprising the step of converting the encoded sum signal and the encoded difference signals into analog signals; transmitting the analog signals; receiving the analog signals; and recovering the digital sum and difference signals before the decoding thereof.

59. The method as defined by claim 57, wherein said pixel values are digital pixel values, and further comprising the step of converting the encoded sum signal and the encoded difference signals into analog signals; transmitting the analog signals; receiving the analog signals; and recovering the digital sum and difference signals before the decoding thereof.

60. The method as defined by claim 56, wherein the number of pixels in the decoded output video frames is substantially the same as the number of pixels in the input video frame arrays, and the pixel values of output video frames correspond to pixel values of corresponding pixels of the input video frame arrays.

61. The method as defined by claim 57, wherein the number of pixels in the decoded output video frames is substantially the same as the number of pixels in the input video frame arrays, and the pixel values of output video frames correspond to pixel values of corresponding pixels of the input video frame arrays.

62. The method as defined by claim 59, wherein the number of pixels in the decoded output video frames is substantially the same as the number of pixels in the input video frame arrays, and the pixel values of output video frames correspond to pixel values of corresponding pixels of the input video frame arrays.

63. The method as defined by claim 56, further comprising the step of converting output pixel values to an output analog video signal.

64. The method as defined by claim 57, further comprising the step of converting output pixel values to an output analog video signal.

65. The method as defined by claim 59, further comprising the step of converting output pixel values to an output analog video signal.

66. The method as defined by claim 62, further comprising the step of converting output pixel values to an output analog video signal.

67. A method for encoding and decoding a video signal, comprising the steps of:
(A) forming encoded signals, by:
storing input video frames as arrays of pixel values;
interrogating the stored arrays for a series of successive frames and generating: (i) a sum signal representative of the sum of the pixel values in a group of pixels, and (ii) a plurality of distinct difference signals representative of the difference between the total of the pixel values of some of the pixels in the group and the total of pixel values of other pixels in the group; the sum signal and each difference signal being generated for a multiplicity of groups which cover a video frame; the sum signal being generated for each frame of the series and a distinct difference signal being generated for each frame of the series; whereby the sum signal is generated at a relatively high information rate and each of the difference signals is generated at a relatively low information rate;
(B) forming decoded signals by combining the sum and difference signals to obtain an output pixel value for each pixel of an output video frame.

68. The method as defined by claim 67, wherein said decoding includes storing the sum signal, storing the difference signals, and combining the stored sum and difference signals.

69. The method as defined by claim 67, wherein said pixel values are digital pixel values, and further comprising the steps of: converting the encoded sum signal and the encoded difference signals into analog signals; transmitting the analog signals; receiving the analog signals; and recovering the digital sum and difference signals before the decoding thereof.

70. The method as defined by claim 68, wherein said pixel values are digital pixel values, and further comprising the steps of: converting the encoded sum signal and the encoded difference signals into analog signals;

transmitting the analog signals; receiving the analog signals; and recovering the digital sum and difference signals before the decoding thereof.

71. The method as defined by claim 69, wherein said step of transmitting said analog signals includes coding the individual difference signals so that they can be identified when the difference signals are recovered.

72. The method as defined by claim 70, wherein said step of transmitting said analog signals includes coding the individual difference signals so that they can be identified when the difference signals are recovered.

73. The method as defined by claim 67, wherein the number of pixels in output video frames of the decoder is substantially the same as the number of pixels in the input video frame arrays, and the pixel values of output video frames correspond to pixel values of corresponding pixels of the input video frame array.

74. The method as defined by claim 68, wherein the number of pixels in output video frames of the decoder is substantially the same as the number of pixels in the input video frame arrays, and the pixel values of output video frames correspond to pixel values of corresponding pixels of the input video frame array.

75. The method as defined by claim 70, wherein the number of pixels in output video frames of the decoder is substantially the same as the number of pixels in the input video frame arrays, and the pixel values of output video frames correspond to pixel values of corresponding pixels of the input video frame array.

76. The method as defined by claim 67, further comprising the step of converting output pixel values to an output analog video signal.

77. The method as defined by claim 68, further comprising the step of converting output pixel values to an output analog video signal.

78. The method as defined by claim 70, further comprising the step of converting output pixel values to an output analog video signal.

79. The method as defined by claim 75, further comprising the step of converting output pixel values to an output analog video signal.

80. A method for decoding an encoded video signal representative of input video frames digitized as an array of pixel values, the encoded signal including a sum signal representative of the sum of pixel values in a group of pixels, and a plurality of distinct difference signals representative of the difference between the total of the pixel values of some of the pixels in the group and the total of the pixel values of other pixels in the group, the sum signal and each difference signal being generated for a multiplicity of groups which cover a video frame, the sum signal being generated at a relatively high information rate and each of the difference signals being generated at a relatively low information rate; the decoding method comprising the steps of:
storing the sum signal;
storing each of the difference signals; and
combining the sum and difference signals for corresponding groups of pixels to obtain a pixel value for each pixel of an output video frame corresponding to the pixel value of the corresponding pixel of the input array.

81. The method as defined by claim 80, further comprising the step of converting output pixel values to an output analog video signal.

82. A decoding method for use in a technique for encoding and decoding a video signal, the encoding including storing input video frames as arrays of digital pixel values and interrogating the stored arrays for a series of successive frames and generating: (i) a sum signal representative of the sum of the pixel values in a group of pixels, and (ii) a plurality of distinct difference signals representative of the difference between the total of the pixel values of some of the pixels in the group and the total of pixel values of other pixels in the group; the sum signal and each difference signal being generated for a multiplicity of groups which cover a video frame; the sum signal being generated for each frame of the series and a distinct difference signal being generated for each frame of the series; whereby the sum signal is generated at a relatively high information rate and each of the difference signals is generated at a relatively low information rate; the decoding method comprising the steps of:
storing the sum signal;
storing each of the difference signals; and
combining the sum and difference signals for corresponding groups of pixels to obtain a pixel value for each pixel of an output video frame corresponding to the pixel value of the corresponding pixel of the input array.

83. The method as defined by claim 82, further comprising the step of converting output pixel values to an output analog video signal.

84. For use in a technique for encoding and decoding a video signal, an encoding method comprising the steps of:
storing input video frames as arrays of digital pixel values; and
interrogating the stored arrays and generating: (i) a sum signal representative of the sum of the pixel values in a group of pixels, and (ii) a plurality of distinct difference signals representative of the difference between the total of the pixel values of some of the pixels in the group and the total of pixel values of other pixels in the group; the sum signal and each difference signal being generated for a multiplicity of groups which cover a video frame; the sum signal being generated at a relatively high information rate and each of the difference signals being generated at a relatively low information rate.

85. The method as defined by claim 84, further comprising the step of converting the encoded sum signal and the encoded difference signals into analog signals; and transmitting the analog signals.

86. For use in a technique for encoding and decoding a video signal, an encoding method comprising the steps of:
storing input video frames as arrays of digital pixel values; and
interrogating the stored arrays for a series of successive frames and for generating: (i) a sum signal representative of the sum of the pixel values in a group of pixels, and (ii) a plurality of distinct difference signals representative of the difference between the total of the pixel values of some of the pixels in the group and the total of pixel values of other pixels in the group; the sum signal and each difference signal being generated for a multiplicity of groups which cover a video frame; the sum signal being generated for each frame of the series and a distinct difference signal being generated for each frame of the series; whereby the sum signal is generated at a relatively high information rate and each of the difference signals is generated at a relatively low information rate.

87. The method as defined by claim 86, further comprising the steps of converting the encoded sum signal and the encoded difference signals into analog signals; and transmitting the analog signals.

88. Apparatus for encoding and decoding a video signal, comprising:
(A) an encoder, including:
means responsive to said video signal for deriving an input video frame as an array of pixel values;
means for interrogating the stored array and for generating (i) a sum signal representative of the sum of the pixel values in a group of pixels, and (ii) a difference signal representative of the difference between pixel values of pixels in the group; the sum signal and the difference signal being generated for a multiplicity of groups which cover the video frame;
said sum signal being generated at a relatively high information rate, and said difference signal being generated at a relatively low information rate;
(B) a decoder, including means for combining the sum and difference signals to obtain an output pixel value for each pixel of an output video frame.

89. Apparatus as defined by claim 88, wherein said decoder includes means for storing the sum signal and means for storing the difference signal; and wherein said combining means is operative to combine the stored sum and difference signals.

90. Apparatus for decoding an encoded video signal representative of input video frames in the form of arrays of pixel values, the encoded signal including a sum signal representative of the sum of pixel values in a group of pixels, and a difference signal representative of the difference between pixel values of pixels in the group, the sum signal and difference signal being generated for a multiplicity of groups which cover a video frame, the sum signal being generated at a relatively high information rate and the difference signal being generated at a relatively low information rate; the decoding apparatus comprising:
means for storing the sum signal;
means for storing the difference signal;
means for combining the sum and difference signals for corresponding groups of pixels to obtain a pixel value for each pixel of an output video frame corresponding to the pixel value of the corresponding pixel of the input array.

91. For use in a system for encoding and decoding a video signal, an encoding apparatus comprising:
means responsive to said video signal for deriving input video frames as arrays of digital pixel values; and
means for interrogating the stored arrays and for generating: (i) a sum signal representative of the sum of the pixel values in a group of pixels, and (ii) a difference signal representative of the difference between pixel values of pixels in the group, the sum signal and difference signal being generated for a multiplicity of groups which cover a video frame, the sum signal being generated at a relatively high information rate and the difference signal being generated at a relatively low information rate.

* * * * *